United States Patent [19]
Jeun

[11] Patent Number: 6,163,512
[45] Date of Patent: Dec. 19, 2000

[54] FOCUS SERVO APPARATUS FOR MULTI-LAYER DISC AND METHOD FOR OPERATING THE SAME

[75] Inventor: Jaehan Jeun, Seoul, Rep. of Korea

[73] Assignee: LG Electronics, Seoul, Rep. of Korea

[21] Appl. No.: 08/950,588

[22] Filed: Oct. 15, 1997

Related U.S. Application Data

[63] Continuation of application No. 08/692,459, Aug. 5, 1996, abandoned.

[30] Foreign Application Priority Data

Aug. 5, 1995 [KR] Rep. of Korea ........................ 95-24243

[51] Int. Cl.$^7$ ................................................. G11B 7/085
[52] U.S. Cl. ........................................... 369/44.29; 369/54
[58] Field of Search .............................. 369/44.29, 44.34, 369/44.35, 44.25, 44.41, 54

[56] References Cited

U.S. PATENT DOCUMENTS

| | | | |
|---|---|---|---|
| 4,740,679 | 4/1988 | Doi ........................ | 369/44.29 |
| 4,878,211 | 10/1989 | Suzuki et al. ............. | 369/44.35 |
| 5,010,538 | 4/1991 | Takeda et al. ............ | 369/44.29 |
| 5,060,215 | 10/1991 | Kawamura et al. ........ | 369/44.35 |
| 5,187,696 | 2/1993 | Ishii et al. ............... | 369/44.35 |
| 5,202,871 | 4/1993 | Yokota ..................... | 369/44.29 |
| 5,745,450 | 4/1998 | Miyazono ................. | 369/44.35 |

FOREIGN PATENT DOCUMENTS 362040623 2/1987 Japan .

*Primary Examiner*—W. R. Young
*Attorney, Agent, or Firm*—Birch, Stewart, Kolasch & Birch, LLP

[57] ABSTRACT

A focus servo apparatus for a multi-layer disc includes a focus driving unit for outputting a driving signal for performing a focus jump operation of pulling in a pick-up and moving a focus of the pick-up, a level holder for maintaining a driving signal level of the driving signal from the focus driving unit corresponding to a focus position when the focus of the pick-up is positioned at a corresponding data surface of a disc, an adder for adding the driving signal from the level holder and a driving signal from a main focus servo unit, and a switch for selectively outputting the driving signal of the main focus servo unit when the pick-up is pulled-in and an output signal from the adder when the focus of the pick-up is positioned at the data surface of the disc. The improved focus servo apparatus is capable of carrying out a stable focus servo operation by incorporating the level holder and a focus jump function.

4 Claims, 6 Drawing Sheets

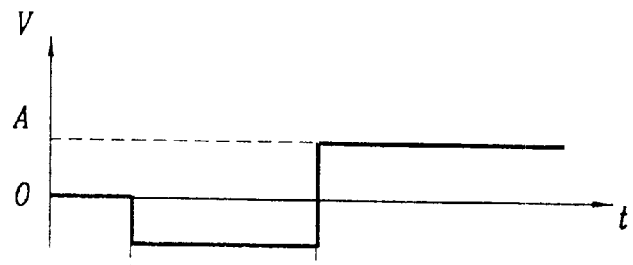
FIG. 6A
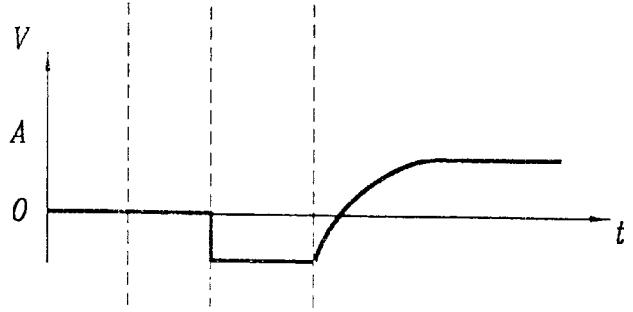
FIG. 6B
FIG. 6C
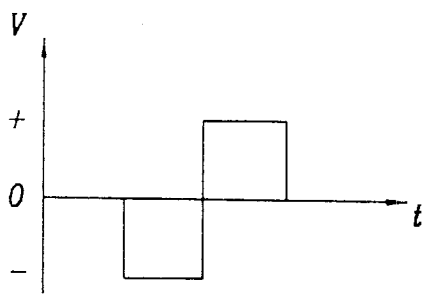
FIG. 7A
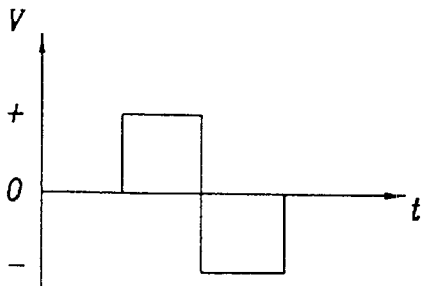
FIG. 7B

FOCUS SERVO APPARATUS FOR MULTI-LAYER DISC AND METHOD FOR OPERATING THE SAME

This application is a continuation, of application Ser. No. 08/692,459 filed on Aug. 5, 1996, now abandoned.

BACKGROUND OF THE INVENTION

1. Field of the Invention

The present invention relates to a focus servo circuit and method for focusing a beam used to reproduce data from a disc, and in particular, to an improved focus servo apparatus for a multi-layer disc which is capable of carrying out a stable focus servo operation using a level holder and a focus jump function.

2. Description of the Prior Art

FIG. 1 shows a focus servo unit for a single-layer disc according to the conventional art, which includes a focus servo pulling-in unit 1 that outputs a driving signal for pulling in an objective lens towards a data surface of a disc, a main focus servo unit 2 that outputs a driving signal for adjusting a focusing of the objective lens at a pulled-in position, a switch 3 for selecting among the driving signals output from the focus servo pulling-in unit 1 and the focus servo main unit, a focus coil 4 for pulling in the objective lens in accordance with a driving signal selected by switch 3, and a focus error detector 5 for generating a focus error signal FE by detecting a focus error signal (FE) from a light signal reflected from a disc signal surface and input through the focus coil 4 and for supplying the focus error signal (FE) to the main focus servo unit 2.

The operation of the focus servo apparatus for a single-layer disc according to the conventional art will not be described in detail.

When information is reproduced from a CD player having a single-layer disc, the focus servo pulling-in unit 1 outputs a DC (direct current) driving signal through the switch to the focus coil 4 for an interval (t2,t3) through the switch in a pulling-in ready condition' as shown in FIG. 3.

The focus coil 4 lowers the objected lens for an interval (t2) in accordance with the DC driving signal output from the focus servo pulling-in unit 1. Then, the focus coil 4 slowly raises the objective lens and fixes the focus of the pick-up onto the data surface of the disc for an interval (t3).

When the objective lens reaches the focus position, the switch 3 is switched to the main focus servo unit 2, resulting in the formation of a focus servo main loop (ML), and shutting off the output of the focus servo pulling-in unit 1.

The focus servo main loop (ML) is formed when the switch 3 is connected to the main focus servo unit 2. This loop is controlled based on the AC (alternating current) focus error signal (FE) indicating the extent of deviation between the focus of the pick-up and the date surface of the disc, where the focus error signal (FE) is varied in accordance with the up-and-down movement of the focus position of the pick-up.

When the objective lens reaches the accurate focus position, no focus error signal (FE) is formed in the focus servo main loop (ML). For that reason the driving signal is not output from the main focus servo unit 2 and, as a result, the objective lens is momentarily lowered at interval t4, as shown in FIG. 3.

Due to the momentary lowering of the objective lens, a light signal reflected from the data surface of the disc is input to the focus error detector 5 through the focus coil 4 to generate an AC focus error signal (FE). In response to the focus error signal (FE), the main focus servo unit 2 outputs a driving signal, arranges the objective lens to the focus position, and performs a reproducing operation of data.

But, as shown in FIG. 2A, when the focus position of the objective lens is set to a standard position thereof, the focus error signal (FE) becomes larger than when the focus position of the objective lens is close to the standard position thereof, and as a result, the precise focusing is impossible to achieve.

Furthermore, when there is one focus position, as in the focus servo apparatus for the single-layer disc, and the variation of the focus position is maintained within the range of an allowable error, the precise focusing is not influenced. However, when there are several focus positions and the focus of the pick-up should be varied from one layer to another layer as in the focus servo apparatus for multi-layer disc, a precise focusing is difficult to carry out due to a large variation of the focus error signal (FE).

Moreover, when the conventional focus servo apparatus for a single-layer disc pulls in the objective lens, it cannot prevent the objective lens from lowering momentarily. For that reason in multi-layer discs, the precise and stable focusing operation cannot be performed, in accordance with the focus error signal (FE) in which the focus position of the pick-up should vary for each layer.

SUMMARY OF THE INVENTION

Accordingly, it is an object of the present invention to provide an improved focus servo apparatus for a multi-layer disc which is capable of achieving a stable and precise focus servo operation on the multi-layer disc by adding a level holder and a focus jump function of the focus servo circuit of a disc reproduction apparatus.

To achieve the above object, there is provided a focus servo apparatus for a multi-layer disc which comprises a focus servo main loop (ML) including a focus error detector for detecting a focus error signal (FE) from the light signal reflected from the disc surface, a main focus servo unit for receiving the focus error signal (FE) from the focus error detector and for outputting a driving signal to adjust a focusing of the pick-up pulled in on the data surface of the disc and a focus coil for varying the position of the pick-up in accordance with the driving signal from the main focus servo unit, and a focus driving unit for outputting ea driving signal for performing a focus jump operation of pulling in the pick-up and moving a focus of the pick-up, a level holder for maintaining a driving signal corresponding to a focus position when the driving signal from the focus driving unit is inputted and the focus of the pick-up is positioned at the corresponding data surface of the disc, an adder for adding a driving signal from the level holder and a driving signal from the main focus servo unit, and a switch for outputting the driving signal from the main focus servo unit when the pick-up is pulled in and outputting an output signal from the adder when the focus of the pick-up is positioned at the data surface of the disc.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 6A to 6C are waveform diagrams of each unit of a focus driving unit in FIG. 4;

FIGS. 7A and 7B are waveform diagrams showing a focus jump operation signal of a pick-up in FIG. 4;

DETAILED DESCRIPTION OF THE PREFERRED EMBODIMENTS

Figure 1:
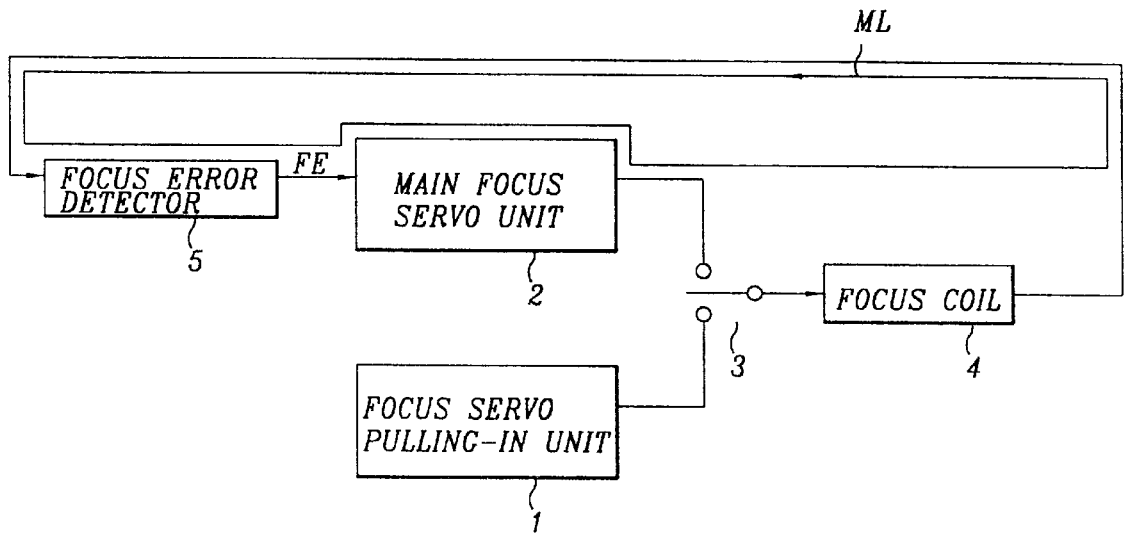
FIG. 1 is a block diagram of a focus servo apparatus for a single-layer disc according to the conventional art.
Figure 2A:
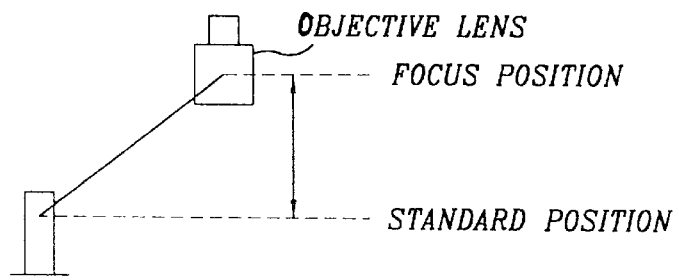
FIGS. 2A–2B are views showing an example of a focusing operation of the conventional apparatus in FIG. 1.
Figure 2B:
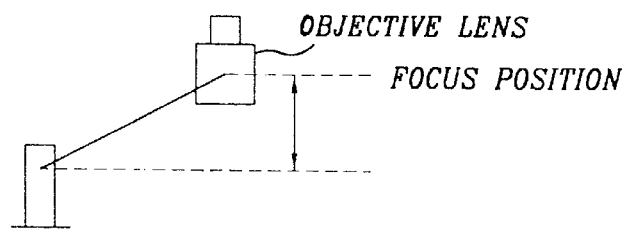
Figure 3:
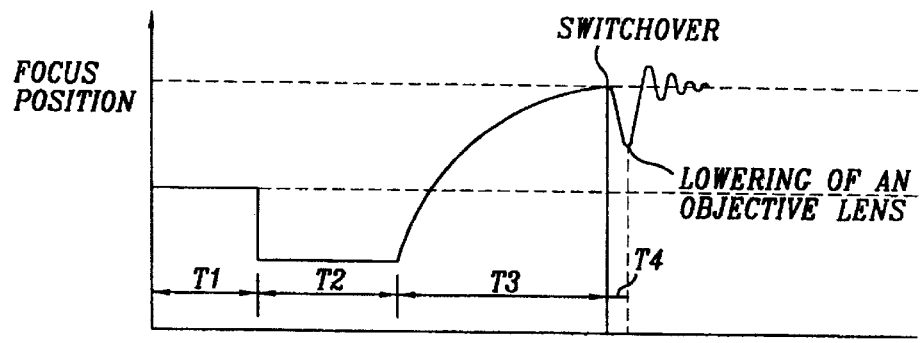
FIG. 3 is a waveform diagram showing a driving signal supplied to a focus coil in FIG. 1.
Figure 4:
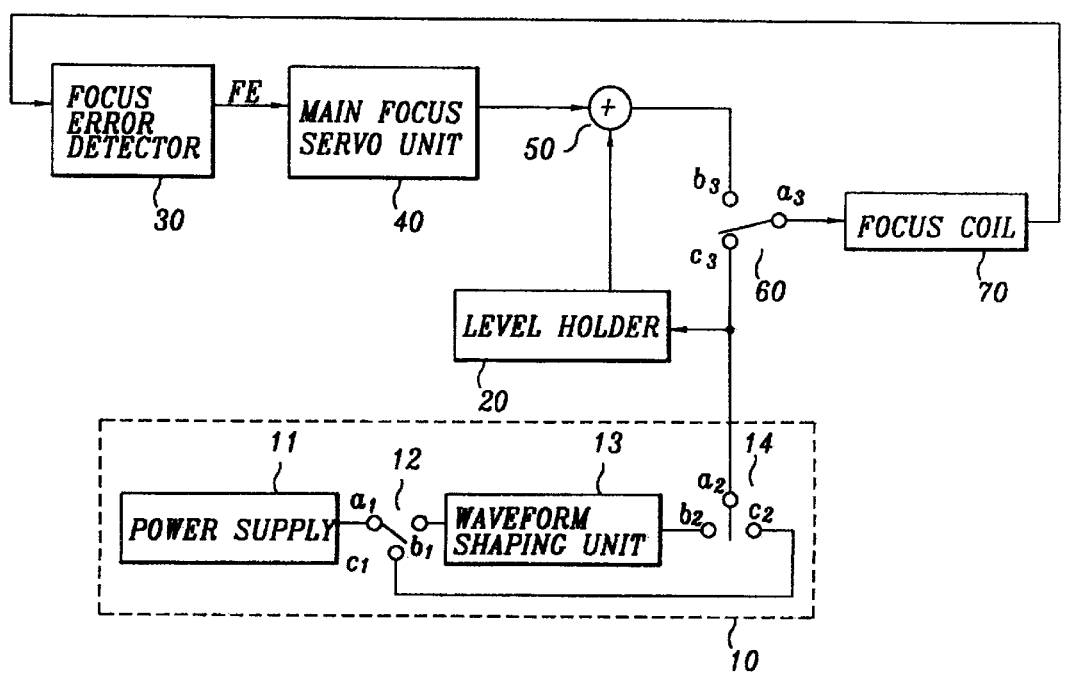
FIG. 4 is a block diagram showing a focus servo apparatus for a multi-layer disc according to the present invention.

FIG. 4 is a block diagram showing an example of a focus servo apparatus for a multi-layer disc according to the present invention. FIG. 4 includes a focus driving unit 10, level holder 20, focus error detector 30, main focus servo unit 40, adder 50, switch 60, and focus coil 70. Focus driving unit 10 outputs a driving signal for pulling-in a pick-up and performing a focus jump operation by shaping a positive or negative signal, or for performing a focus jump operation based on the pick-up. Level holder 20 maintains a driving signal level corresponding to the focus position based upon the driving signal output by the focus driving unit 10 when the focus of the pick-up is positioned on the data surface of the disc. Focus error detector 30 for detects a focus error signal (FE) from a light signal reflected from the disc surface. Main focus servo unit 40 outputs a driving signal that is used to adjust the focusing of an objective lens in accordance with the focus error signal (FE) from the focus error detector 30. Adder 50 adds the signal output from the level holder 20 and the driving signal output by the main focus servo unit 40. Switch 60 selectively outputs a signal from either the adder 50 or the focus driving unit 10. Focus coil 70 moves the objective lens in accordance with the driving signal inputted thereto through the switch 60.

The focus driving unit 10 includes power supply 11, switch 12, waveform shaping unit 13, and switch 14. Power supply 11 generates a positive or negative signal for pulling-in the pick-up and performing a focus jump operation. Switch 12 selectively sends the [output] generated by the power supply 11 to either waveform shaping unit 13 or switch 14. Waveform shaping unit 13 shapes and outputs the positive or negative signal supplied from the switch 12. Switch 14 selectively outputs either the signal shaped by the waveform shaping unit 13 of the output generated by the power supply 11 and supplied through the switch 12.

The operation of the focus servo apparatus for a multi-layer disc will now be described with reference to the accompanying drawings.

Figure 5A:
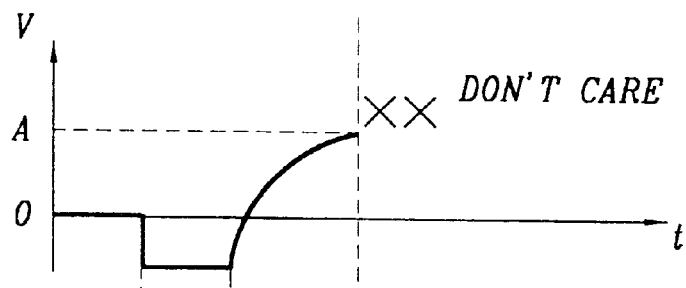
FIGS. 5A to 5D are waveform diagrams of the signals from each unit in FIG. 4.

While reproducing information using a CD player, the driving signal shown in FIG. 5A is output from the focus driving unit 10. The driving signal is then input simultaneously to the level holder 20 and the focus coil 70 through the switch 60. The objective lens equipped in the pick-up is pulled-in towards the data surface of the disc based on the driving signal.

That is, when a negative voltage (−A) or a positive voltage (+A) is outputted from the power supply 11 as shown in FIG. 6A, that voltage is input to the waveform shaping unit 13 through the swich 12 the movable terminal (a1) which is connected to the fixed terminal (b1). After receiving the voltage output from the power supply 11 and shaping the waveform as shown in FIG. 6B, the waveform shaping unit 13 outputs the driving signal shown in FIG. 6C.

The waveform shaping unit 13 has a function of a low pass filter, which controls the sharp change of the inputted voltage.

The driving signal shaped in the waveform shaping unit 13 is input to the focus coil 70 through the switch 12 which is configured such that the movable terminal a1 is connected to the fixed terminal b1, and the switch 14 which is configured such that the movable terminal a2 is connected to the fixed terminal b2. Thus, the objective lens equipped in the pick-up is pulled-in towards the data surface of the disc.

Figure 5B:
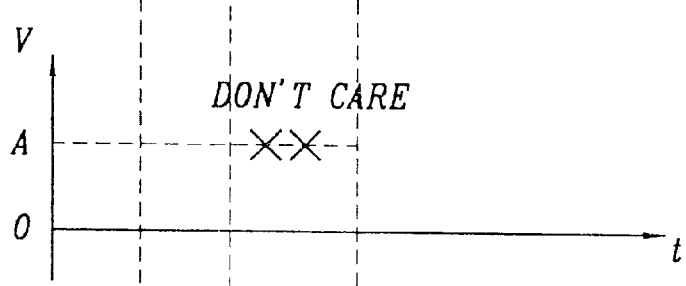
Figure 5C:
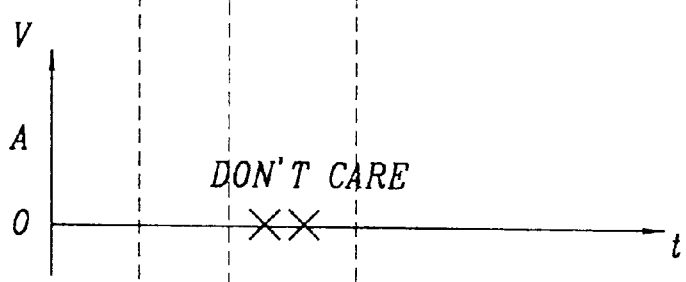

Here, when the objective lens reaches the accurate focus position at time t1, the level holder 20 maintains the value of the driving signal of the focus coil 70 at the level achieved prior to time t1, as shown in FIG. 5B, and the main focus servo unit 40 outputs a driving signal shown in FIG. 5C.

Figure 5D:
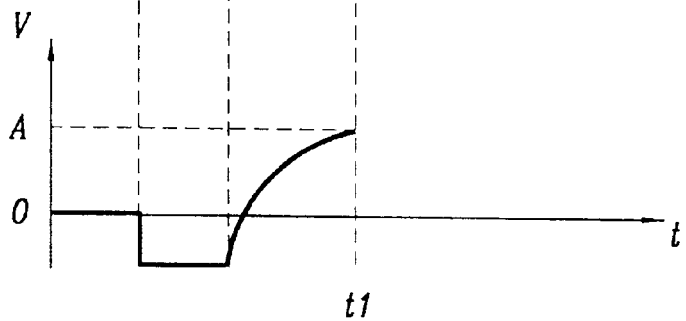

The movable terminal a3 of the switch 60 is switched over to the fixed terminal b3 at the time t1 which corresponds to the accurate focus position, the adder 50 adds the outputs from the level holder 20 and the main focus servo unit 40 and outputs the added value through the switch 60, effectively obtaining the driving signal inputted to the focus coil 70 as shown in FIG. 5D.

Therefore, the objective lens is driven in accordance with the driving signal shown in FIG. 5D, without experiencing a momentary lowering of the objective lens from the accurate focus position immediately after the focus servo is pulled-in. In addition, through this system the focus servo does not experience reduced efficiency due to the up-and-down movement of the focus position of the pick-up.

A focus jump operation is performed during the reproduction of the multi-layer disc when the focus is moved from one layer to another layer. During a focus jump operation, a negative voltage −A or a positive voltage +A generated by the power supply 11 in FIG. 6A, is input to the focus coil 70 through the switch 12 which is configured such that the movable terminal a1 is connected to the fixed terminal c1 and the switch 14 which is configured such that the movable terminal a2 is connected to the fixed terminal c2.

Here, FIG. 7A shows a characteristic of the voltage signal output from the power supply 11 when the focus position is moved from an upper layer to a lower layer, and FIG. 7B shows a characteristic of the voltage signal output from the power supply 11 when the focus position is moved from a lower layer to an upper layer.

Therefore, the reproducing operation of the multi-layer disc can be performed by vertically jumping the focus position of the pick-up in accordance with the controlling of the power supply 11.

Figure 8:
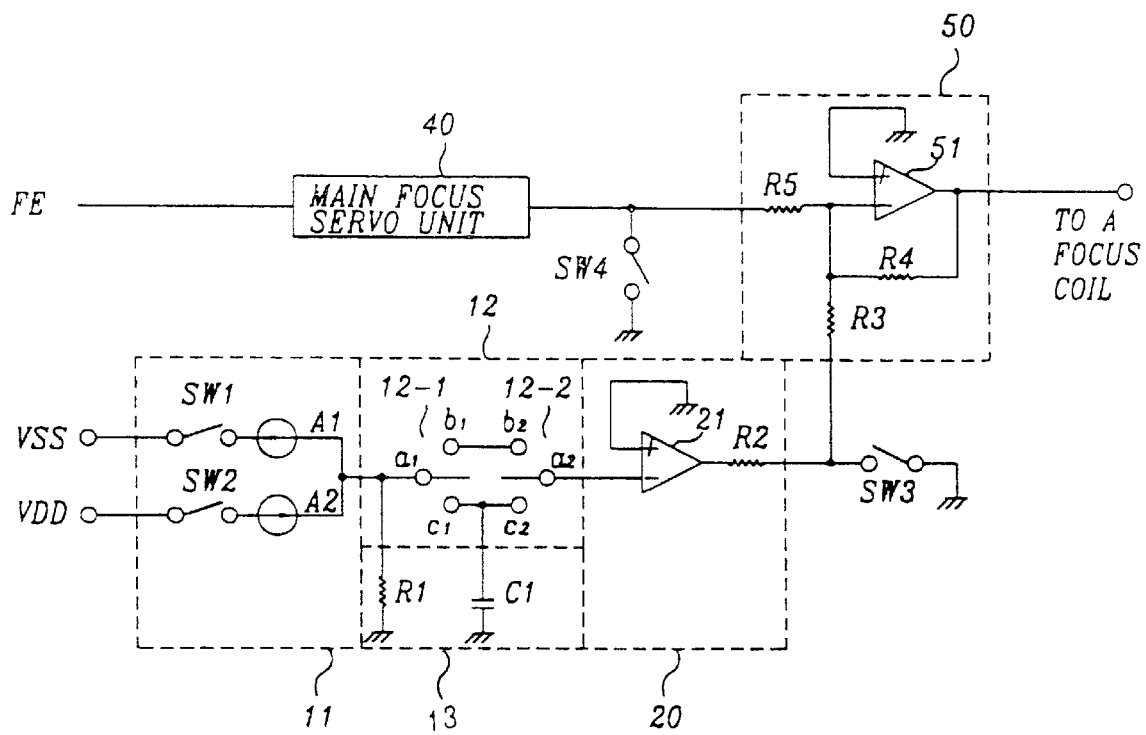
FIG. 8 is a block diagram of another embodiment of a focus servo apparatus for a multi-layer disc according to the present invention.

FIG. 8 is a block diagram of another embodiment of a focus servo apparatus for a multi-layer disc according to the present invention. The embodiment shown in FIG. 9 includes power supply 11, switch 12, level holder 20, main focus servo unit 40, switches SW3 and SW4, adder 50, and waveform shaping unit 13 which is composed of a resistance R1 and a capacitor C1.

The operation of this embodiment of the present invention will now be explained with reference to FIGS. 8 through 12.

Figure 9:
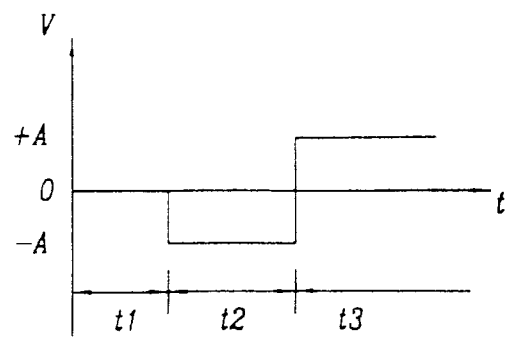
FIG. 9 is an output waveform diagram of a power supply in FIG. 6.

The switches (SW1,SW2) are both opened during the interval t1; the switch (SW1) is shut, and the switch (SW2) is opened during interval t2; the switch (SW1) is opened and the switch SW2 is shut during interval t3; and the DC current shown in FIG. 9 is output from the power supply during intervals t1 to t3.

Figure 10:
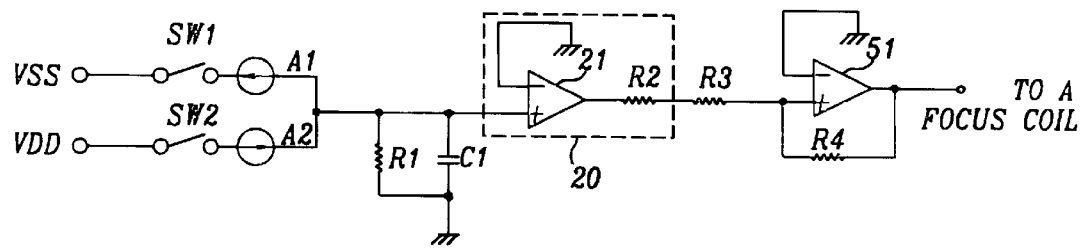
FIGS. 10 through 12 are equivalence circuit diagrams showing each operating unit in FIG. 8.

When the pulling-in operation of the focus servo is conducted, the movable terminal (a1) of a first switch 12-1 is connected to the fixed terminal (c1) thereof, the movable terminal (a2) of the second switch 12-2 is connected to the fixed terminal (c2) thereof, a switch (SW3) is opened and a switch (SW4) is shut, resulting in the formation of the equivalent circuit shown in FIG. 10.

The DC signal shown in FIG. 9 is output through the equivalence circuit, causing the objective lens equipped in the pick-up to be pulled-in towards the data surface of the disc.

When the objective lens reaches the focus position, the movable terminal (a1) of the first switch 12-1 is connected to the fixed terminal (b1) thereof, the movable terminal (a2) of the second switch 12-2 is connected to the fixed terminal (c2) thereof, and the switches (SW3,SW4) are all opened. As a result, the operation of the focus servo main loop including the level holder 20 is performed by the equivalent circuit shown in FIG. 11.

Figure 11:
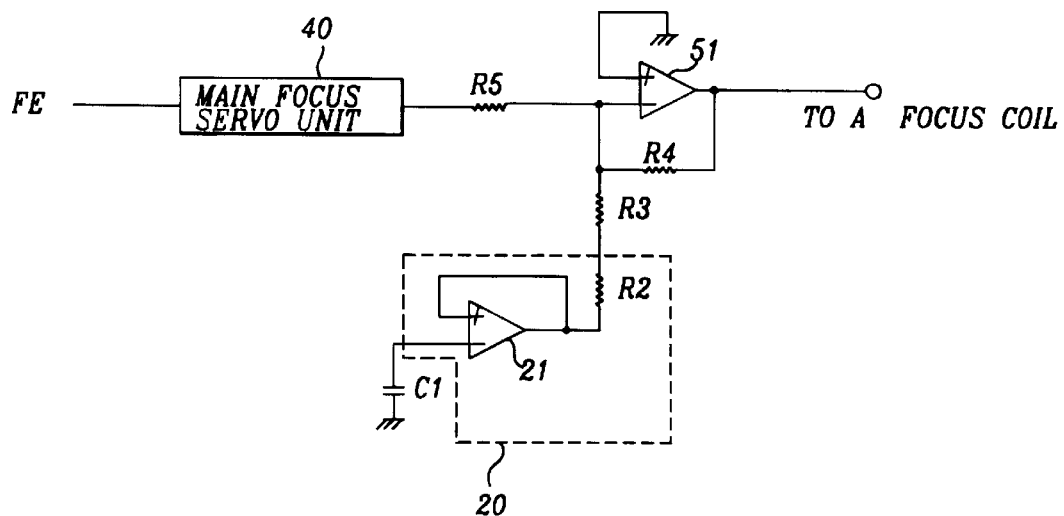

In the equivalence circuit of FIG. 11, the capacitor C1 of the level holder 20 holds the value of the DC current of the driving signal corresponding to the focus position.

Figure 12:
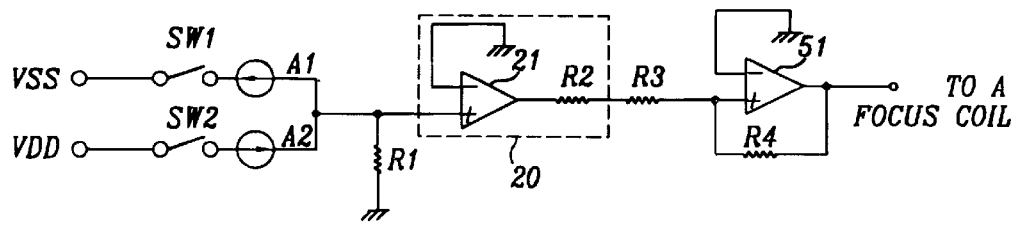

When the focus jump operation of the focus servo is carried out, the movable terminal (a1) of the first switch 12-1 is connected to the fixed terminal (b1) thereof, the movable terminal (a2) of the second switch 12-2 is connected to the fixed terminal (b2) thereof, the switch (SW3) is opened and the switch (SW4) is shut, resulting in the formation of the equivalent circuit shown in FIG. 12.

Then, by controlling the switches (SW1,SW2) of the power supply 11, a positive or negative signal is formed, causing the focus of the pick-up to be moved from one layer to another.

Meanwhile, to stop the operation of the focus servo apparatus for a multi-layer disc, the switches (SW3,SW4) are both closed, and the driving signal to the focus coil 70 becomes 0V(ground).

As described in detail above, the focus servo apparatus for a multi-layer disc according to the present invention has the effect that, by adding the level holder and the focus jump function to the focus servo circuit of the reproducing apparatus for the disc, the reduced efficiency of the focus servo circuit due to the up-and-down movement of the focus position can be prevented, and the momentary lowering of the objective lens generated directly after the pulling-in of the objective lens can be also prevented. As a result, it has the advantage of performing a stable and precise focus servo function.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A focus jump control apparatus of a multi-layer recording medium having at least two recording layers, comprising:

a focus driving unit that moves an object lens vertically with respect to the recording layers in response to a request for a change of a vertical focus position for the multi-recording medium;

a level holder for responding to an output of the focus driving unit to prevent further vertical movement of the object lens and to maintain an object lens driving voltage for a fixed time when the object lens reaches a position corresponding to the request for the change of a vertical focus position;

an adder that receives a signal outputted from the level holder and a focus error signal outputted from an object lens driving coil after the vertical movement of the object lens is prevented by the level holder, and that outputs a signal of operation result thereof; and a servo controller that controls the vertical position of the object lens with respect to the recording layers in accordance with the signal of operation result thereof.

2. The focus jump control apparatus according to claim 1, wherein the focus driving unit provides a focus jump control signal to select a layer among the layers of a multi-layer recording medium.

3. The focus jump control apparatus according to claim 1, wherein the focus driving unit comprises:

a power supply that provides an objective lens move signal; and a wave shaping unit that filters said move signal.

4. A focus jump control apparatus of a multi-layer recording medium having at least two recording layers, comprising:

a focus driving unit that moves an object lens vertically with respect to the recording layers using a first or second control signal;

a selector that selects the first or the second control signal in accordance with whether the vertical movement of the object lens is established according to a request for a change for a vertical focus position with respect to the multi-layer recording medium;

a level holder for responding to an output of the focus driving unit to prevent further vertical movement of the object lens and to maintain an object lens driving voltage for a fixed time when the object lens reaches a desired focus position in accordance with the selected control signal;

an adder that receives a signal outputted from the level holder and a focus error signal outputted from an object lens driving coil after terminating the vertical movement of the object lens, and that outputs a signal of operation result thereof; and a servo controller that controls the vertical position of the object lens with respect to the recording layers in accordance with the signal of operation result thereof.

* * * * *